United States Patent [19]

Close

[11] 3,771,628
[45] Nov. 13, 1973

[54] WHEEL RETARDER
[76] Inventor: James Garth Close, 3215 29th St., Lubbock, Tex.
[22] Filed: Jan. 17, 1972
[21] Appl. No.: 218,124

[52] U.S. Cl.................... 188/189, 188/21, 188/187
[51] Int. Cl............................................. F16d 59/00
[58] Field of Search ................. 188/10, 19, 21, 187, 188/189

[56] References Cited
UNITED STATES PATENTS
1,015,063   1/1912   Noel .................................. 188/189

*Primary Examiner*—Duane A. Reger
*Attorney*—John F. Booth et al.

[57] ABSTRACT

An automatically operable brake for use on wheeled vehicles such as merchandise carts, baby carriages, wheel chairs, or the like, which is automatically engaged when the speed of the cart exceeds a desired maximum and remains engaged until the cart is brought to a complete stop and the direction of rotation of the wheels on the cart is momentarily reversed.

12 Claims, 8 Drawing Figures

PATENTED NOV 13 1973 3,771,628

WHEEL RETARDER

BACKGROUND OF THE INVENTION

The present invention relates to an improved brake for reducing the tendency of merchandise carts and the like from attaining speeds which are in excess of safe operational speeds, and more particularly, to an improved brake of the type which does not interfere with or retard the operation of the cart until the cart is moved at a speed in excess of a desired maximum whereupon the brake is automatically engaged to apply a retarding or braking force which does not lock the wheel to prevent rotation but remains engaged until the cart is brought to a stop and the rotation of the wheels is reversed in direction. The invention also contemplates the use of a brake which is automatically engaged when the cart exceeds a maximum desired speed and whereupon the effective braking force of the brake assembly itself is increased as the magnitude of the speed of the cart is also increased to thus increase the braking force with the increase in speed of the wheel.

DESCRIPTION OF THE PRIOR ART

The manufacturers and users of wheeled vehicles such as merchandise carts, baby carriages, wheel chairs, luggage carts, hand trucks, building scaffolds, and the like have long recognized the risk of damage to property and injury to individuals by these vehicles moving at undesired excessive speeds and colliding with persons or property causing damage or injury.

The risk of damage or injury is especially present in the use of merchandise carts which are provided by supermarkets or other types of retail stores for the customers' use during their shopping tour to transport merchandise about the store. Due to the fact that supermarkets and retail stores are normally crowded with customers whose attention is primarily concerned with viewing and selecting merchandise, the danger of collision with and injury to individuals in the store is serious when merchandise carts are pushed through stores at excessive speeds. In addition, in many supermarkets and stores, the merchandise carts are used to transport groceries and other purchased items to the customers' automobiles in the parking lot where the merchandise is unloaded into the automobiles and the cart is left at the unloading site. In many instances, these parking lots are constructed on an incline due to the terrain and for purposes of drainage, and when a cart is allowed to move unrestrained down the incline, damage to cars parked in the parking lot can result or even injury to individuals walking in the parking lot may occur.

To eliminate these problems, numerous configurations of brakes have been proposed in the prior art. One type of conventional brake comprises a mechanism which prevents rotation of one or more wheels of the cart and is actuated and controlled by a lever or bar located on the cart adjacent the portion of the cart which is engaged by the hands of the customer during the pushing of the cart. These apparatus are of the type which are constantly in a condition to apply a braking or retarding force to the wheels of the cart unless a bar or control lever is held in a deactuated position by a customer. Although this type of brake has served its purpose, it has not proved entirely satisfactory under all conditions of service for the reason that in some cases it is inconvenient if not impossible for the customer to manually hold the brake in a deactuated position during the moving of the cart for the reason that in many instances the customers' hands are occupied examining merchandise or guiding the activities of small children in the store. Also in some instances, the customer will push the cart through the store, unaware that the brake is actuated, thus causing the friction between the nonrotating wheel and the floor to wear a flat spot on the wheel, thus prematurely causing the wheel to need replacement.

Another type of brake which has been used comprises a brake mechanism which prevents rotation of one or more wheels of the cart when the brake is manually engaged. Although when correctly applied this type of brake has been effective to prevent the "runaway" of carts down an incline, the customer cannot always be counted on to apply the brake when the cart is left on an incline.

SUMMARY OF THE INVENTION

The general purpose of the present invention is to provide an improved braking mechanism for wheeled vehicles, such as merchandise carts or the like which embraces all the advantages of similarly employed prior art devices yet possesses none of the aforementioned disadvantages. To attain this, the present invention contemplates the use of a unique, improved brake mechanism which automatically engages when the speed of the merchandise cart exceeds a predetermined maximum and remains engaged until the cart is brought to a halt and moved in a reverse direction. This allows the customer to steer and utilize the cart without the necessity of occupying his hands with deactuating the brake during movement of the cart. Also, the brake will automatically engage when the cart proceeds at a speed in excess of the desired maximum, thus deterring the movement of carts at excessive speeds.

OBJECTS OF THE INVENTION

It is therefore an object of the present invention to provide an improved brake which automatically engages when a wheel of the vehicle exceeds the specified maximum amount.

Another object of the present invention is the provision of an improved brake for a wheel which remains engaged until disengaged by the operator.

An additional object of the present invention is the provision of an improved brake for a wheel which increases the retarding force as the speed of the wheel increases.

A further object of the invention is the provision of an improved brake for a wheel which is simple and inexpensive to manufacture and install.

Other objects and many of the attendant advantages of this invention will be readily appreciated by those of ordinary skill in the art as the same becomes better understood by reference to the following detailed description when considered in connection with the accompanying drawings, in which:

DESCRIPTION OF THE PREFERRED EMBODIMENT

Referring now to the drawings wherein like reference characters designate like or corresponding parts throughout, there is illustrated for purposes of description of the present invention, a merchandise or shopping cart 10. This merchandise cart 10 is of a type normally available to customers of supermarkets and large department stores for use in transporting merchandise, but it is to be understood, of course, that the word cart as used herein is used in a generic sense meaning a wheeled vehicle, and that the brake of the present invention could be applied to other types of wheels. The merchandise cart 10 is illustrated with a pair of rear wheel assemblies 12 and a pair of front wheel assemblies 14 which support the cart and allow it to roll across the floor of a supermarket or store. The rear wheel assemblies 12 can be of the non-swiveling type, as illustrated, or can be of the swiveling type as are the front wheel assemblies 14. In the present embodiment, a brake is applied to one of the front wheel assemblies 14, but it is apparent from the following description that the brake of the present invention could be applied to one or more of the front or rear wheel assemblies whether of the swiveling or non-swiveling type.

The brake is illustrated in detail in FIGS. 2, 3, 4, 5, and 6 and is of the type which automatically engages when the speed of rotation of wheel assembly 14 reaches a desired maximum. The brake then remains in engagement until the cart 10 and wheel assembly 14 is brought to a standstill and the direction of rotation of the wheel assembly 14 is reversed to disengage the brake, thereafter the cart can be used in its normal and ordinary manner until the speed of the wheel again exceeds the desired maximum.

As is illustrated, the front wheel assembly 14 has a vertical swivel 16 which is attached between a mounting stud 18 for attaching the wheel assembly to the cart 10 and a bifurcated frame 20. The bifurcated frame 20 has two arms 22 which extend on either side of the castor wheel 24. The wheel 24 is rotatably attached to the arms 22 by means of an axle 26 which extends through the center of a ballbearing assembly 28. The outer race 27 of the ballbearing assembly 28 is attached to rotate with the wheel 24 while the inner race 29 is fixed with the axle 26 and does not rotate. The axle 26 is attached to the arms 22 by means of a pair of nuts 30 which are threaded onto the exterior of the axle 26. In this manner the wheel 24 is rotatably attached to the frame 20 and is allowed to pivot in a vertical plane about swivels 16.

Fixed to the inner race 29 to remain stationary during rotation of the wheel 24 are right and left hand thread guards 32 and 34, respectively. These thread guards 32 and 34 are formed with rolled edges 36 and 38, respectively, so that the thread guards protect the bearing assembly 28 during rotation of the wheel. As is shown in FIGS. 2, 4, 5, and 6, the edge 38 of the left hand thread guard 34 has a tab 40 which is deformed out of the surface of the guard itself, so that it projects into the interior of the area enclosed by the guard 34.

The wheel 24 is provided with a plurality of circumferentially spaced axially extending blind bores 42; and in the present embodiment, four of these bores 42 are shown spaced 90° apart. These circumferentially spaced bores 42 are each of a size and a shape to receive a coil compression spring 44 and a cup shaped pressure foot 46 therein. A ring shaped brake disc 48 is held in position adjacent the pressure feet 46 by means of a retaining ring 50 which is attached to the wheel 24 by means of suitable fasteners 52. Although the brake disc 48 is held in axial position by the retaining ring 50, it is free to rotate with respect to the retaining ring 50 but is held in resilient frictional contact with the ring 50 and pressure feet 46 by means of the resilient force exerted on the pressure feet 46 by compression springs 44.

Figure 6:
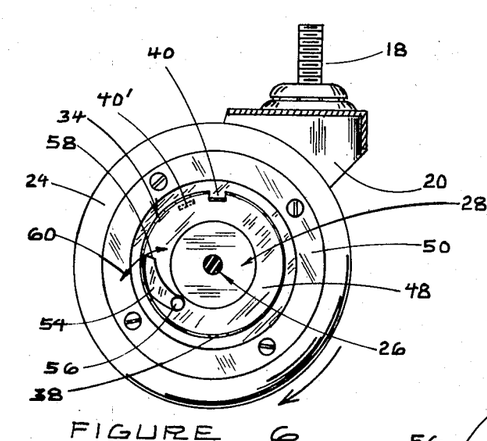
FIG. 6 illustrates a section of the device taken on lines 6—6 of FIG. 3, looking in the direction of the arrows.

As is shown in detail in FIG. 6, a pawl 54 is pivotally mounted on the brake disc 48 by means of a fastener 56 so that the pawl can rotate about the fastener 56 in the direction of arrows 60 as the wheel 24 rotates in a clockwise direction. The pawl 54 is provided with a flat surface 58 on the side of the pawl facing the direction in which the wheel normally rotates. It is to be noted that this pawl 54 and brake disc 48 will rotate with the wheel 24 due to the frictional contact between the pressure feet 46, retaining ring 50, and the brake disc 48.

Figure 7:
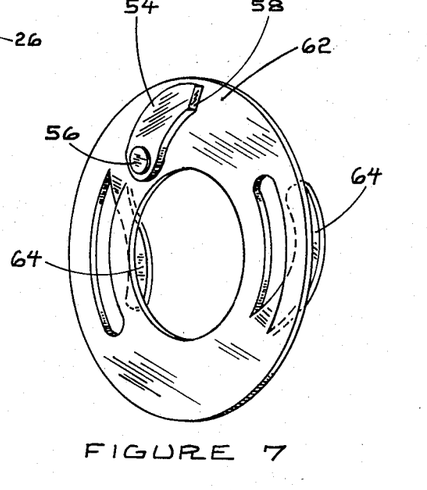
FIG. 7 is a perspective view of an alternative configuration for the brake disc.

It is also envisioned that other configurations could be used to hold the disc 48 in frictional contact against the ring 50. For example, a brake disc 62, as shown in FIG. 7, could be molded with leaf spring fingers 64 extending from the surface thereof for contacting the wheel 24. With the springs 44 integrally formed in the disc 62, the necessity of having the bores 42, springs 44, and feet 46 is eliminated.

OPERATION OF THE FIRST EMBODIMENT

Figure 1:
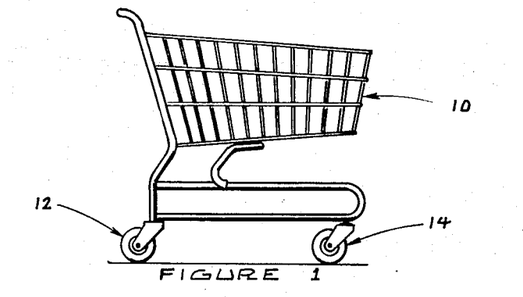
FIG. 1 illustrates a side elevation view of a merchandise cart with a wheel having the improved brake of the present invention installed thereon.
Figure 2:
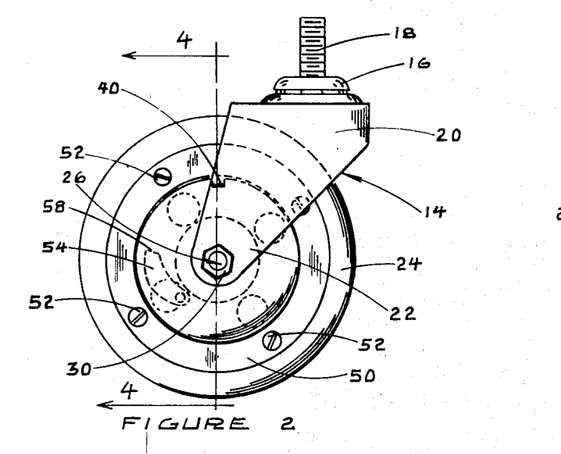
FIG. 2 illustrates an enlarged side elevation view of a wheel having the improved brake of the present invention installed thereon.
Figure 3:
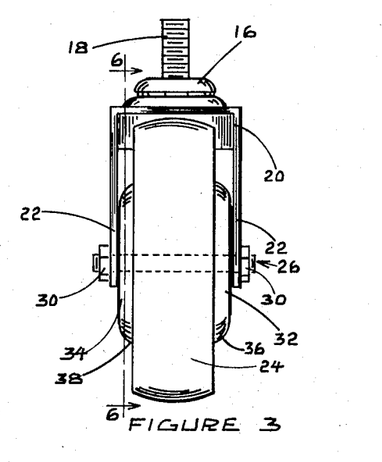
FIG. 3 is a front elevation view of the wheel illustrated in FIG. 2.
Figures 4, 5:
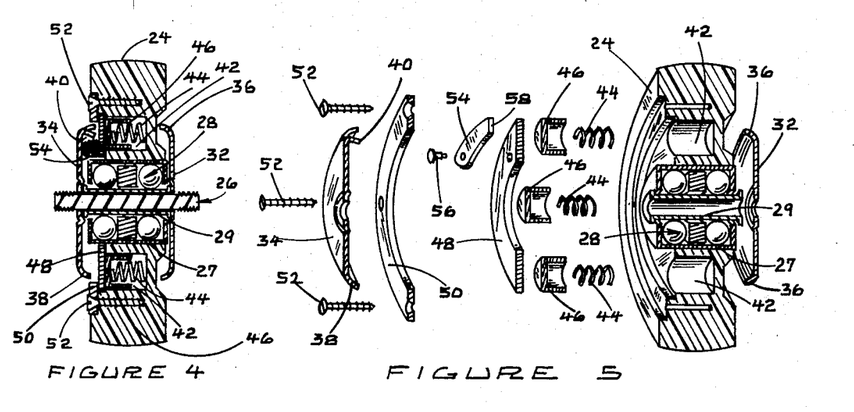
FIG. 4 illustrates a partial section of the device taken on Line 4—4 of FIG. 2, looking in the direction of the arrows with the frame and attachment nuts omitted for clarity.
FIG. 5 is a partial section similar to FIG. 4 which is illustrated in an exploded perspective view to show the various parts used in the assembly of the brake of the present invention.

The advantages of the brake of the present invention can best be pointed out in the following description of the operation of the brake with reference to FIG. 6. As pointed out previously, and illustrated in FIG. 1, the wheel assembly 14 with the brake assembly of the present invention is attached to a merchandise or shopping cart 10. The pawl 54 is rotated with the wheel 24 as the cart 10 is translated across a surface, and the centrifugal force acting on the pawl 54 as it rotates will tend to rotate the pawl to the position shown in FIG. 6 with the surface 58 adjacent the edge 38 of the left hand thread guard 34. Also, as the pawl 54 rotates to a position directly below the axle of the wheel, the gravitational force will tend to rotate the pawl 54 to the position with the surface 58 adjacent the edge 38. As the pawl 54 rotates and approaches a position located above the axle of the wheel, the gravitational force acting on the pawl 54 can overcome the centrifugal force and force the surface 58 to rotate inwardly away from the edge 38 and bypass the tab 40. If the speed of the wheel 24 is increased to a magnitude so that the centrifugal force acting on the pawl 54 is greater than the force of gravity, the surface 58 will remain adjacent the edge 38 as the wheel rotates to contact the tab 40. With the engagement of the tab 40 with the surface 58, the brake disc 48 will be prevented from rotating with the wheel 24, thus causing a retarding force to be exerted on the wheel 24 due to the frictional contact between the pressure feet 46, which rotate with the wheel 24, and the interior surface of the brake disc 48, which does not rotate with the wheel 24. In this manner a retarding force will be exerted on the wheel 24 and tend to slow down the speed of the cart 10.

It should also be noted that this brake assembly will remain in engagement until the cart comes to a complete stop and the wheel 24 is moved in the reverse direction, thus allowing the pawl 54 to rotate in a downward direction because of gravitational forces and allow surface 58 to bypass tab 40. Thereafter, the cart 10 is ready for use in a normal operating manner without the application of the brake.

The retarding force exerted on the wheel 24 can be varied by selecting springs 44 and 64 of various sizes and spring constants or by forming the bores 42 with varying depths or even placing spacers in the bottom of the bores.

The speed of rotation at which the brake is engaged can also be selected by changing the position of the tab 40. This changing of the position of the tab 40 can be accomplished by loosening the nuts 30 and rotating the thread guard 34 as required to angularly position the tab 40 as desired. Thereafter, the nuts 30 can be tightened with the tab 40 held in position, such as that shown in FIG. 6 in phantom lines and referenced as 40'. The effect of rotating the position of the tab 40 is to cause the brake to engage at a different speed. This is because the effect of gravitational force acting on the pawl 54 to cause the pawl 54 to rotate away from edge 38 at the location of the tab 40' is less than at the location 40, and therefore the centrifugal force will tend to cause the pawl 54 to engage the tab 40' at a lower speed than at position 40.

It is also envisioned that the exterior of the thread guard 34 could be provided with indicia to be aligned with a reference point on the frame 20, to allow the easy setting of a desired speed of engagement of the brake.

It is also envisioned that more than one brake assembly could be mounted on each wheel. For example, a first and second brake assembly, similar to the one described above, could be mounted on the right and left sides, respectively, of the wheel 24. The first brake assembly could be adjusted to engage at a first speed and the second brake assembly to engage at a second speed, which is greater in magnitude than the first speed. By assembling the wheel in this manner, the braking force can be increased as the speed of rotation of the wheel increases.

Another example envisions two brake assemblies installed on one wheel with one brake assembly effective to retard excessive speeds in one direction of rotation of the wheel and the other brake assembly effective to retard excessive speeds in a direction opposite to the direction of the first brake assembly.

It is also contemplated that one or more of the brake assemblies, as described herein, could be installed on one or more of the wheels of a given vehicle to achieve the braking desired.

OPERATION OF THE SECOND EMBODIMENT

Figure 8:
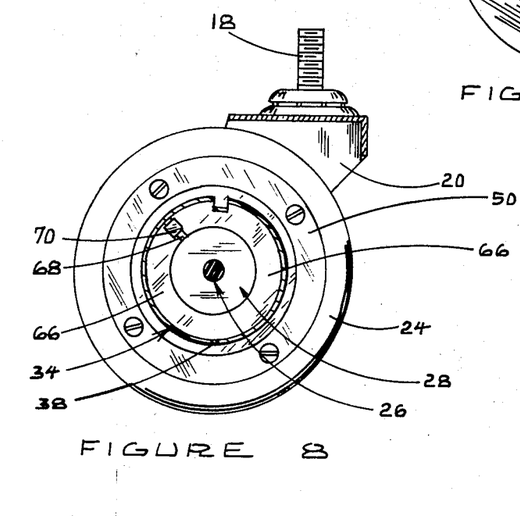
FIG. 8 is a sectional view similar to FIG. 6 illustrating another configuration of the brake of the present invention.

A second embodiment of the invention is shown in FIG. 8, as being contructed from components which are identical to those shown in FIG. 6, except that a different brake disc 66 without a pawl 54 and fastener 56 mounted thereon is utilized. This disc 66 is shown in FIG. 8 as having a radially extending raceway or slot 68 in which is slidably mounted a weight 70. This weight 70 can be of any suitable shape so as to radially slide in the slot as the brake disc 66 rotates. The operation of this second embodiment is identical to the first embodiment, in that, the weight 70 will be acted on by centrifugal and gravitational forces and will engage the tab 40 when the speed of the wheel 24 reaches a sufficient magnitude. Obviously, this brake embodiment can be actuated without regard to the direction of rotation of the wheel and more than one of the embodiments of brake could be placed on each wheel, if desired.

It should be understood, of course, that the foregoing disclosure relates to only preferred embodiments of the invention and that numerous modifications or alterations may be made by those of ordinary skill in the art without departing from the spirit and scope of the invention as set forth in the appended claims.

What is claimed and desired to be secured by United States Letters Patent is:

1. In combination:
   a. a cart;
   b. a plurality of rotatable wheels for movably supporting said cart;
   c. brake means operatively associated with at least one of said wheels for resisting rotation of said at least one wheel in excess of a maximum speed to resist excessive speeds of said cart, said brake means comprising selectively operational retarding means frictionally contacting and rotating with said at least one wheel tending to retard the rotation of said at least one wheel in a first direction; and
   d. actuation means operational when said at least one wheel rotates in said one direction at a speed at least as great as said maximum speed for preventing rotation of said retarding means to apply a frictional force tending to retard rotation of said at least one wheel in said first direction, and deactuation means operational when said at least one wheel rotates in a second reverse direction of said first direction for allowing unretarded rotation of said retarding means.

2. A combination as defined in claim 1 wherein said retarding means, when engaged, applies a force of fixed magnitude tending to retard rotation of said at least one wheel in a first direction as said at least one wheel varies in speed of rotation.

3. A combination as defined in claim 1 wherein said actuation means is provided with an adjustment means for changing the speed at which the retarding means is engaged so that the maximum speed can be varied and set as desired.

4. A combination as defined in claim 1 wherein means are provided on said retarding means for increasing the magnitude of the retarding force when said at least one wheel rotates in said one direction at a speed at least as great as a second maximum speed, and wherein said maximum speed is in excess of said first maximum speed.

5. A combination as defined in claim 1 wherein a second retarding means is provided for applying a second force tending to retard rotation of said at least one wheel in said second direction, and a second actuation means is provided and is operational when said at least one wheel rotates in said second direction at a speed at least as great as a third maximum speed for engaging said second retarding means.

6. A combination as defined in claim 5 wherein a second deactuation means is provided and is operational when said at least one wheel is rotated in said first direction for disengaging said second retarding means.

7. In combination:
   a. a cart;
   b. a plurality of rotatable wheels for movably supporting said cart;
   c. brake means operatively associated with at least one of said wheels for resisting rotation of said at least one wheel in excess of a maximum speed to resist excessive speeds of said cart, said brake means comprising selectively engagable retarding means for applying a force tending to retard the rotation of said at least one wheel in a first direction; and
   d. the improvement which comprises said retarding means positioned to engage and rotate with said at least one wheel, actuation means operational when said at least one wheel rotates in said one direction at a speed at least as great as said maximum speed for preventing rotation of said retarding means to apply a frictional force tending to retard rotation of said at least one wheel in said first direction, deactuation means operational when said at least one wheel rotates in a second reverse direction of said first direction for disengaging allowing unretarded rotation of said retarding means.

8. A combination as defined in claim 7 wherein said retarding means, when engaged, applies a force of fixed magnitude tending to retard rotation of said at least one wheel in a first direction as said at least one wheel varies in speed of rotation.

9. A combination as defined in claim 7 wherein said actuation means is provided with an adjustment means for changing the speed at which the retarding means is engaged so that the maximum speed can be varied and set as desired.

10. A combination as defined in claim 7 wherein means are provided on said retarding means for increasing the magnitude of the retarding force when said at least one wheel rotates in said one direction at a speed at least as great as a second maximum speed, and wherein said maximum speed is in excess of said first maximum speed.

11. A combination as defined in claim 7 wherein a second retarding means is provided for applying a second force tending to retard rotation of said at least one wheel in said second direction, and second actuation means is provided and is operational when said at least one wheel rotates in said second direction at a speed at least as great as a third maximum speed for engaging said second retarding means.

12. A combination as defined in claim 11 wherein a second deactuation means is provided and is operational when said at least one wheel is rotated in said first direction for disengaging said second retarding means.

* * * * *

UNITED STATES PATENT OFFICE
CERTIFICATE OF CORRECTION

Patent No. 3,771,628    Dated November 13, 1973

Inventor(s) James G. Close

It is certified that error appears in the above-identified patent and that said Letters Patent are hereby corrected as shown below:

Col. 6, line 7, change "contructed" to --constructed--.

Col. 6, line 34, delete "a.  a cart;".

Col. 6, line 35, delete "b." and insert --a.--; delete "plurality of"; delete "wheels" and insert --wheel-- (after "rotatable" and before "for".

Col. 6, line 36, delete "said" and insert --a-- before "cart".

Col. 6, line 37, delete "c." and insert --b.--; delete "at least one of" (lines 37-38).

Col. 6, line 38, change "wheels" to --wheel--; delete "at least one" (lines 38-39).

Col. 6, line 43, delete "at least one".

Col. 6, line 44, delete "at least one".

Col. 6, line 45, delete "d." and insert "c."; after "said" delete "at least one".

Col. 6, lines 49-50, delete "at least one".

Col. 6, line 51, delete "at least one".

Page 2

UNITED STATES PATENT OFFICE
CERTIFICATE OF CORRECTION

Patent No. 3,771,628         Dated November 13, 1973

Inventor(s)   James G. Close

It is certified that error appears in the above-identified patent and that said Letters Patent are hereby corrected as shown below:

Col. 6, line 57, delete "at least one".

Col. 6, line 58, delete "at least one".

second force tending to retard rotation of said wheel in said second direction, and a second actuation means is provided and is operational when said wheel rotates in said second direction at a speed at least as great as a third maximum speed for engaging said second retarding means.--

Col. 7, line 1, delete "at least one".

Col. 7, line 15, delete "at least one".

Col. 7, line 18, delete "a.  a cart;".

Page 3

UNITED STATES PATENT OFFICE
CERTIFICATE OF CORRECTION

Patent No. 3,771,628          Dated November 13, 1973

Inventor(s) James G. Close

It is certified that error appears in the above-identified patent and that said Letters Patent are hereby corrected as shown below:

Col. 7, line 19, delete "b." and insert --a.--; delete "plurality of"; change "wheels" to --wheel--.

Col. 7, line 20, delete "said" and insert --a--.

Col. 7, line 21, delete "c." and insert --b.--.

Col. 7, lines 21-22, delete "at least one of".

Col. 7, line 22, change "wheels" to --wheel--.

Col. 7, lines 22-23, delete "at least one".

Col. 7, line 25, change "engagable" to --engageable--.

Col. 7, line 27, delete "at least one".

Col. 7, line 29, delete "d." and insert --c.--.

Col. 7, lines 30-31, delete "at least one".

Col. 7, line 32, delete "at least one".

Col. 7, line 36, delete "at least one".

Col. 8, line 1, delete "at least one".

Col. 8, line 3, delete "disengaging".

Col. 8, line 7, delete "at least one".

Col. 8, line 8, delete "at least one".

UNITED STATES PATENT OFFICE
CERTIFICATE OF CORRECTION

Patent No. 3,771,628   Dated November 13, 1973

Inventor(s) James G. Close

It is certified that error appears in the above-identified patent and that said Letters Patent are hereby corrected as shown below:

Col. 8, line 18, delete "at least one".

Col. 8, line 33, delete "at least one".

Signed and sealed this 11th day of February 1975.

(SEAL)
Attest:

RUTH C. MASON
Attesting Officer

C. MARSHALL DANN
Commissioner of Patents
and Trademarks